Jan. 10, 1950    B. L. TRAPNELL    2,494,497
EDUCATIONAL DEVICE
Filed Aug. 9, 1946    2 Sheets-Sheet 1
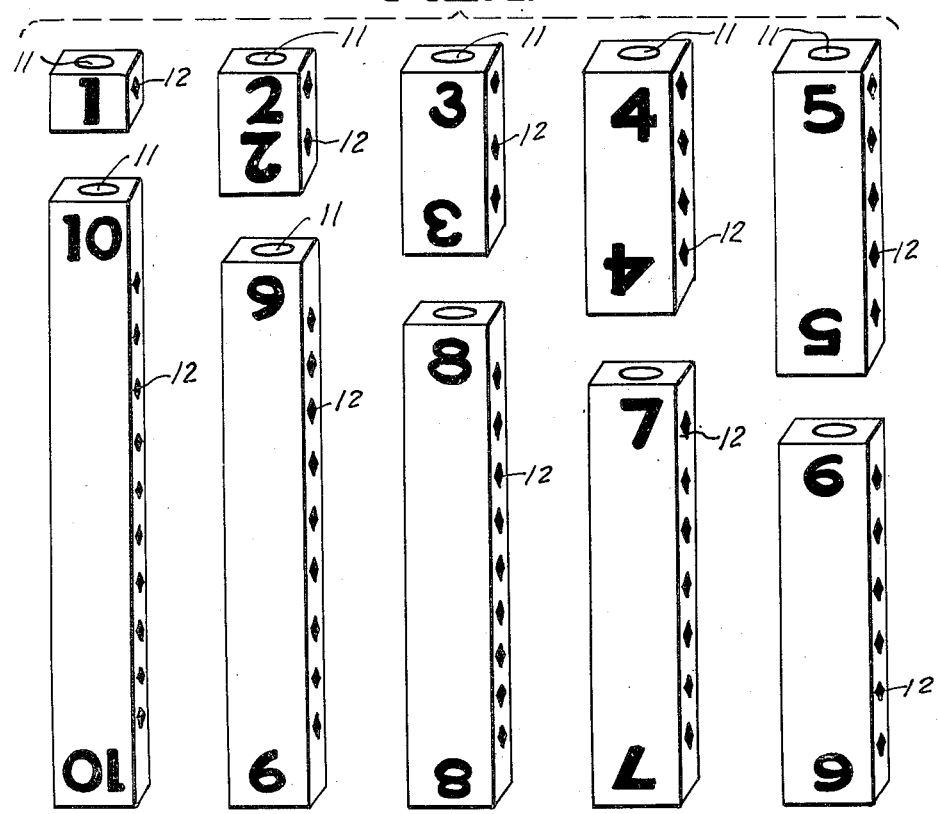
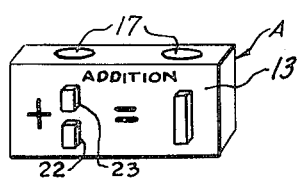
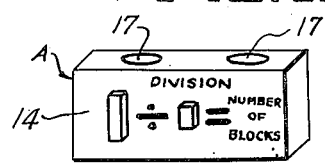
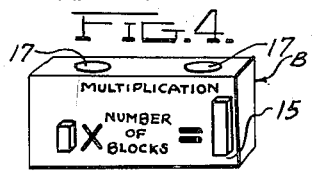
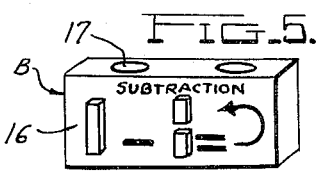
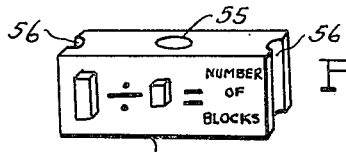
INVENTOR.
Buel L. Trapnell
BY
Barnes, Kisselle, Laughlin & Raisch
ATTORNEYS Jan. 10, 1950     B. L. TRAPNELL     2,494,497
EDUCATIONAL DEVICE
Filed Aug. 9, 1946     2 Sheets-Sheet 2
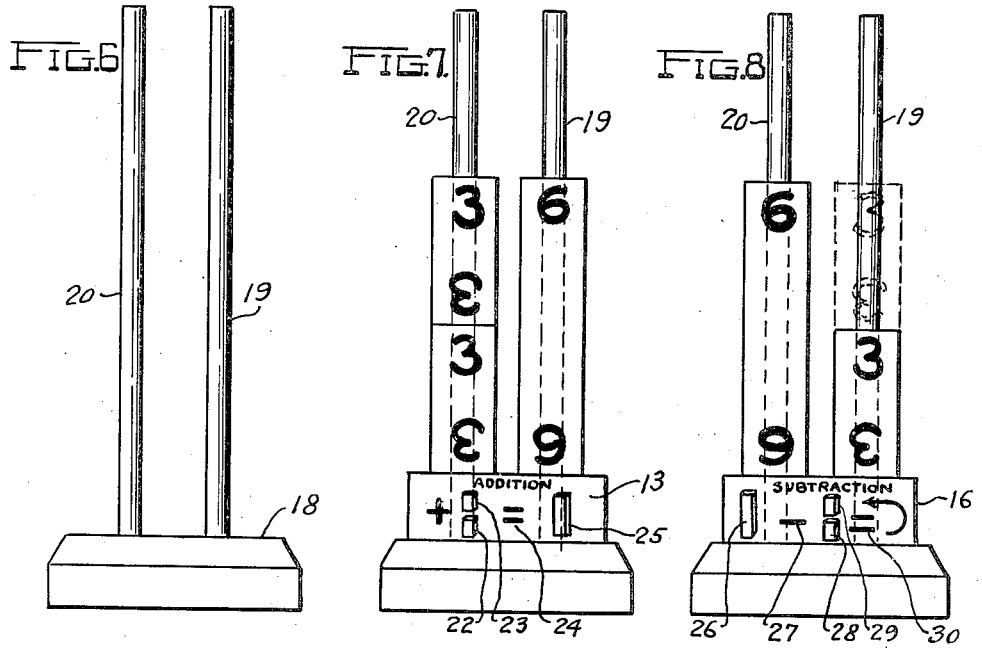
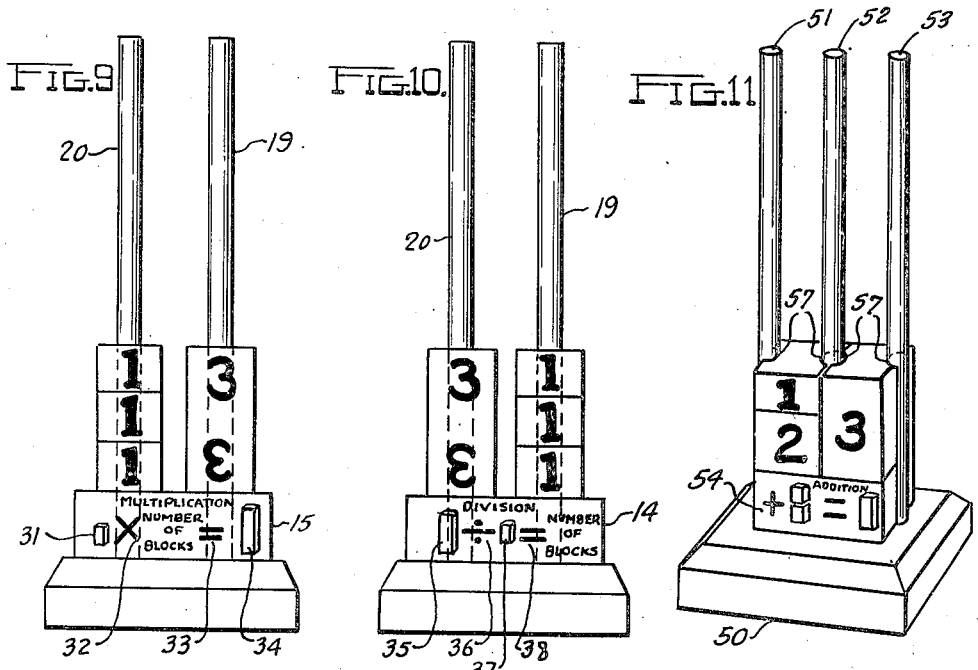
INVENTOR.
Buel L. Trapnell
BY
ATTORNEYS Patented Jan. 10, 1950

2,494,497

UNITED STATES PATENT OFFICE 2,494,497

EDUCATIONAL DEVICE

Buel L. Trapnell, Pulaski, Ga.

Application August 9, 1946, Serial No. 689,324

4 Claims. (Cl. 35—73)

This invention relates to an educational toy and in particular to an educational toy for teaching children mathematics.

It is an object of this invention to produce an educational toy by means of which a child can teach himself mathematics and which also can be used by an instructor to teach mathematics.

It is an object of this invention to produce an educational toy for teaching mathematics which is very simple, efficient, and by means of which mathematics can be taught visually and concretely.

Fig. 1 are perspective views showing ten types of blocks which can be used with my educational toy.

Figs. 2, 3, 4 and 5 are perspective views of the two key blocks forming a part of my toy.

Fig. 6 is a view of the standard for supporting the above-mentioned blocks.

Figs. 7, 8, 9 and 10 are elevations of my toy illustrating its use for teaching addition, subtraction, multiplication, and division respectively.

Fig. 11 is a perspective showing a modified form of my educational toy.

Fig. 12 is a perspective of the key block used with the modified form of my invention.

Referring to Fig. 1 of the drawings, I have illustrated ten blocks bearing numbers 1, 2, 3, 4, 5, 6, 7, 8, 9, 10, respectively. I have chosen ten blocks merely for purposes of description because obviously my toy can be used for teaching mathematics in any range of numbers but as a practical matter in teaching youngsters one would only deal with addition, subtraction, multiplication and division of numbers in a range such as from 1 to 10.

The height of each block in relation to all the other blocks is directly proportional to the number on the block, that is, block 1 is one unit, for example, one inch high; block 2, two units or two inches high; block 3, three units or three inches high; block 4, four units or four inches high; block 5, five units or five inches high; block 6, six units or six inches high; block 7, seven units or seven inches high; block 8, eight units or eight inches high; block 9, nine units or nine inches high; block 10, ten units or ten inches high.

Each block is provided with a central opening or bore 11 extending completely through the same. Each block also has painted, impressed, or otherwise formed thereon as many diamonds 12 as there are units in the block, for example, on block number 10 there are ten diamonds, on block number 1, one diamond, on block number 3, three diamonds, etc.

My toy requires two key blocks generally designated A and B. The side faces of one key block A are referenced 13 and 14. The side faces of the other key block B are referenced 15 and 16. Key block face 13 is used for addition; key block face 14 for division; key block face 15 for multiplication; and key block face 16 for subtraction. Each block is provided with two bores 17 through the same.

My toy requires a standard upon which the above mentioned blocks are mounted at various times during the use of the toy. This standard, by way of example, can comprise a base 18 and two posts 19 and 20.

The operation of my toy is as follows:

*Addition.*—Place addition key block A with face 13 toward the reader on posts 19 and 20 by passing posts 19 and 20 through bores 17. Now select the blocks representing the numbers to be added and place these blocks on post 20 by inserting post 20 through bores 11. By way of example, I have chosen the addition of 3 and 3, Fig. 7, and therefore have placed two three unit blocks on post 20. On post 19 I now place the one block which will reach the same height as the other block. This the instructor can readily do without any trial, but the child will perhaps arrive at block 6 by trial and error. Since block 6 reaches the same height as the two three unit blocks, therefore 6 is the correct answer for the addition of 3 and 3.

Note that key block A on its face has indicia printed thereon. This indicia comprises pictures 22 and 23 of two blocks and to the left of these pictures 22 and 23 is one plus sign. These pictures of blocks 22 and 23 are aligned with post 20 and also with the unit blocks placed thereon. To the right of pictures 22 and 23 is placed the equal sign 24 and to the right of the equal sign is positioned a picture 25 of a block which is equal in height to the combined height of blocks 22 and 23. Picture 25 is aligned with post 19 and also with the unit block placed thereon. This visually shows that the sum of blocks on post 20 will equal the unit represented by the block on post 19.

*Subtraction.*—For subtraction block B with face 16 toward the reader is placed on posts 19 and 20. The block representing the number from which it is desired to subtract is now selected and placed on post 20. By way of example, I have chosen number 6. One now chooses the block representing the number it is desired to subtract from 6 and places this block on post 19. By way of example, I have chosen 3. On top of block 3 on post 19, Fig. 8, one now places the one block which when positioned on block 3 will reach and be equal in height to block 6 on post 20. Obviously, the block positioned on block 3 in Fig. 8 which will reach the top of block 6 on post 20, Fig. 8, will be the number 3 block. This block gives one the correct answer and shows that 6 minus 3 equals 3.

Subtraction face 16 has on its face a picture 26 of a block representing the number from which one desires to subtract, a minus sign 27, pictures of two blocks 28 and 29, and an equal sign 30. The sum of the heights of blocks 28 and 29 equals the height of block 26 and indicates that block 28 subtracted from block 26 will leave the number of units represented by block 29.

*Multiplication.*—This is shown in Fig. 9. Multiplication key block B is placed on posts 19 and 20 with face 15 toward the reader. One selects the block number to be multiplied and places it on post 20. By way of example, this is shown as number 1. Repeat blocks of this same number are placed upon post 20 until there are as many blocks on post 20 as you wish to multiply. In other words, if you wish to multiply 1 times 3, you place three 1 blocks on post 20. On post 19 you now place the one block which will be of equal height to the blocks on post 20. This block will be block 3 and 3 is the correct answer.

On key block face 15 I also place a picture 31 of a block, a multiplication sign 32, "number of blocks," an equal sign 33, and a picture of a block 34 which indicates that the number of the blocks on post 20 multiplied by the number of these blocks on post 20 equals the unit length of the block on post 19.

*Division.*—For division key block A with face 14 toward the reader is placed on posts 19 and 20. I now select the large block number to be divided and place this on post 20. By way of example, I have chosen the block which represents the number 3. On post 19 one now places the block representing the number by which I wish to divide. I have chosen 1 as the divisor. One now continues placing on post 19 additional blocks numbered 1 until the total blocks numbered 1 are equal in height to block 3 on post 20. One now counts the number of blocks on post 19 and this gives the correct answer; namely, 3 divided by 1 equals 3.

On division key block face 14 I place a picture 35 of a block, followed by a division sign 36, a picture of a block 37, an equal sign 38, and a notation "number of blocks." This shows that the number represented by 35 divided by the number represented by block 37 equals the number of blocks 37 which must be placed one upon the other to equal the height of block 35.

In Fig. 11 I have shown a modified form of my invention comprising a base 50, posts 51, 52 and 53. Key block 54, Fig. 12, has a bore 55 through the center thereof and a vertical groove 56 in each end parallel to the bore. The unit blocks 1 to 10 have vertical slots or grooves 57 on two opposite sides. Since in this form of the invention there are three posts instead of two, the key blocks are set over the center post 52 which passes through bore 55, and between posts 51 and 53 which interengage key block 54 in grooves 56. The unit blocks 1 to 10 will slide between posts 51 and 52 and 52 and 53 which they interengage in grooves 57. The mode or operation of use of this form of the invention is identical with that of the principal form and since this form of the invention is cheaper to produce, it may be considered the preferred form of my invention.

I claim:

1. An educational device comprising at least one block of unit length and a plurality of blocks of diverse lengths but each having a length which is a multiple of said unit length, each of said blocks having a bore extending lengthwise therethrough for positioning said blocks upon the below-mentioned posts, a key block having indicia thereon of the mathematical operation to be performed, said key block having two parallel bores extending therethrough for positioning said key block upon said below-mentioned posts, and two juxtapositioned posts for said blocks, said key block being adapted to be held jointly by both of said posts, one of said posts receiving a block of multiple unit length and positioned upon said key block as indicated by said key block, the other post receiving a plurality of blocks each of lesser unit length but in total equal to said block of multiple unit length, said blocks of lesser unit length also being positioned upon said key block as indicated thereby whereby the said blocks illustrate concretely a mathematical problem and its solution.

2. An educational device comprising a plurality of blocks of unit length and a plurality of blocks of diverse lengths but each having a length which is a multiple of said unit length, a key block having indicia thereon of the mathematical operation to be performed, said indicia including a picture of a block of multiple unit length, a mathematical sign, and one or more blocks of lesser length than the said aforementioned multiple length block, and two juxtapositioned holders for said blocks, said key block being adapted to be held jointly by both of said holders, one of said holders receiving said block of multiple unit length which is positioned upon said key block above the picture of a multiple unit length block, the other holder receiving a plurality of blocks each of less length than said multiple unit length block but in total length equal to the length of said block of multiple unit length, said last mentioned plurality of blocks being positioned upon said key block as indicated by the picture appearing upon said key block of one or more blocks each of a length less than said multiple unit length block.

3. The combination as set forth in claim 2 wherein said holder comprises a base and two parallel vertical posts, said key block has two parallel bores therethrough for positioning the key block upon said posts and upon said base and the other of said blocks each has a bore therethrough for mounting the said blocks upon said posts as indicated by the key block.

4. The combination as set forth in claim 2 wherein said holder comprises a base and three parallel vertical posts, said key block has a central bore therethrough through which the center post is passed and two grooves in the ends of the key block parallel to said central bore for interengagement with the outer of said vertical posts and the other of said blocks each has parallel grooves in its opposite ends for mounting the blocks between the center and outer posts as indicated by the key block.

BUEL L. TRAPNELL.

REFERENCES CITED

The following references are of record in the file of this patent:

(Other references on following page)

UNITED STATES PATENTS

| Number | Name | Date |
|---|---|---|
| 422,612 | Neuhaus | Mar. 4, 1890 |
| 677,952 | Cartwright | July 9, 1901 |
| 805,365 | Knappe | Nov. 21, 1905 |
| 889,515 | Foley | June 2, 1908 |
| 971,185 | Freeman, Sr. | Sept. 27, 1910 |
| 1,151,279 | Lewis | Aug. 24, 1915 |
| 1,329,850 | Pye | Feb. 3, 1920 |
| 1,396,379 | Moore | Nov. 8, 1921 |
| 1,471,437 | Wood | Oct. 23, 1923 |
| 1,483,916 | Troidl | Feb. 19, 1924 |
| 1,578,554 | Seligman | Mar. 30, 1926 |
| 1,594,376 | Passmore | Aug. 3, 1926 |
| 1,649,578 | Deming | Nov. 15, 1927 |
| 1,694,405 | Troidl | Dec. 11, 1928 |
| 1,696,988 | Troidl | Jan. 1, 1929 |
| 1,950,072 | Townsend | Mar. 6, 1934 |
| 2,014,675 | Webster | Sept. 17, 1935 |

FOREIGN PATENTS

| Number | Country | Date |
|---|---|---|
| 525,040 | France | May 26, 1921 |